United States Patent
Tanury et al.

(10) Patent No.: US 10,641,637 B2
(45) Date of Patent: May 5, 2020

(54) LEVEL DETECTOR FOR A HOT MELT SYSTEM

(71) Applicant: Hot Melt Technologies, Inc., Rochester Hills, MI (US)

(72) Inventors: Bryan Tanury, Rochester Hills, MI (US); Ed Spearing, Lake Orion, MI (US); Colin Holzman, Warren, MI (US)

(73) Assignee: HOT MELT TECHNOLOGIES, INC., Rochester Hills, MI (US)

( * ) Notice: Subject to any disclaimer, the term of this patent is extended or adjusted under 35 U.S.C. 154(b) by 0 days.

(21) Appl. No.: 16/105,080

(22) Filed: Aug. 20, 2018

(65) Prior Publication Data

US 2020/0056922 A1 Feb. 20, 2020

(51) Int. Cl.
*G01F 23/20* (2006.01)
*G01F 23/00* (2006.01)

(52) U.S. Cl.
CPC .......... *G01F 23/20* (2013.01); *G01F 23/0076* (2013.01)

(58) Field of Classification Search
CPC ............................. G01F 23/20; G01F 23/0076
See application file for complete search history.

(56) References Cited

U.S. PATENT DOCUMENTS

| | | | | |
|---|---|---|---|---|
| 3,494,507 A * | 2/1970 | Ricciardi | ............. | G01G 11/003 177/121 |
| 3,876,105 A | 4/1975 | Kelling | | |
| 4,054,784 A * | 10/1977 | Ricciardi | ............... | G01G 11/12 177/105 |
| 4,111,272 A * | 9/1978 | Ricciardi | ............. | G05D 7/0605 177/50 |
| 4,139,070 A * | 2/1979 | Hanson | ................... | G01G 19/42 177/200 |
| RE32,101 E * | 4/1986 | Ricciardi | ............. | G05D 7/0611 177/185 |
| 4,821,922 A * | 4/1989 | Miller | ................... | B29B 13/022 177/184 |
| 4,867,343 A * | 9/1989 | Ricciardi | ................. | B67D 7/00 222/1 |
| 4,883,200 A | 11/1989 | Miller et al. | | |
| 5,007,560 A * | 4/1991 | Sassak | ...................... | B67D 1/04 222/1 |
| 5,103,401 A * | 4/1992 | Johnson | ............... | G05D 7/0623 177/105 |
| 5,423,455 A | 6/1995 | Ricciardi et al. | | |
| 5,657,904 A * | 8/1997 | Frates | ................... | B29B 13/022 219/421 |
| 5,662,243 A | 9/1997 | Bondeson | | |
| 5,855,232 A * | 1/1999 | Oda | .......................... | B65B 1/28 141/364 |
| 6,007,236 A * | 12/1999 | Maguire | ................... | B01F 3/18 366/141 |
| 6,164,189 A * | 12/2000 | Anson | ..................... | A47J 31/56 99/281 |

(Continued)

*Primary Examiner* — Frederick C Nicolas
(74) *Attorney, Agent, or Firm* — Carlson, Gaskey & Olds, P.C.

(57) ABSTRACT

An illustrative example level detector for a hot melt system includes a scale having a load cell and a controller having an indicator configured to alert an operator when a weight detected by the load cell has decreased by a user-selected maximum allowable amount.

17 Claims, 4 Drawing Sheets

(56) References Cited

U.S. PATENT DOCUMENTS

| | | | |
|---|---|---|---|
| 7,694,589 B2 * | 4/2010 | Mehus | G01G 3/14 |
| | | | 177/25.11 |
| 2003/0155035 A1 * | 8/2003 | Ichikawa | B65B 1/16 |
| | | | 141/301 |
| 2010/0107885 A1 * | 5/2010 | Kirschner | A23F 3/18 |
| | | | 99/279 |
| 2013/0140335 A1 * | 6/2013 | Banno | B22D 37/00 |
| | | | 222/590 |
| 2015/0075625 A1 | 3/2015 | Ganzer et al. | |
| 2017/0199073 A1 * | 7/2017 | Carreel | G01G 3/1402 |
| 2017/0312778 A1 | 11/2017 | Ramosevac | |

* cited by examiner

LEVEL DETECTOR FOR A HOT MELT SYSTEM

BACKGROUND

Many industries utilize hot melt adhesives and sealant materials for a wide range of applications. Hot melt materials are typically solid thermoplastics that become fluid at elevated temperatures and re-solidify upon cooling to form a bond or create a seal. Hot melt materials may be useful for bonding a wide variety of substrates, including wood, metal, foam, plastic, paper, textiles, and more. These hot melt materials are stored and transported in solid form and must be melted before they can be used in their final application. Hot melt systems generally include a hopper or tank for receiving solid hot melt material and a heating element to melt the material. After melting, the hot melt fluid is selectively dispensed via a handgun, for example.

Hot melt systems perform best when their melt tanks are kept sufficiently full. In some systems, when a tank empties, it may take an hour or more to resume full production upon refilling, which results in lost productivity. Some known systems use a capacitive level detection sensor to monitor the level of hot melt adhesive in the tank to prevent the tank from emptying.

SUMMARY

An illustrative example level detector for a hot melt system includes a scale having a load cell and a controller having an indicator configured to alert an operator when a weight detected by the load cell has decreased by a user-selected maximum allowable amount.

An illustrative example hot melt system includes a melt unit having a melt tank, a scale arranged to detect a weight of the melt unit, and a controller. The controller has an indicator configured to alert an operator when the scale detects a weight of the melt unit has decreased by a user-selected maximum allowable amount.

An illustrative example method of maintaining a desired fill level in a hot melt tank of a level detection system having a scale situated to detect a weight of a hot melt tank includes determining a desired minimum weight of the hot melt tank based on an operator input, periodically measuring the weight of the hot melt tank with the scale, and alerting the operator when the weight of the hot melt tank falls below the desired minimum weight.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention such as the disclosed level detector may be used with a hot melt unit for any type of hot melt material to alert an operator when the melt unit needs refilling.

Figure 1:
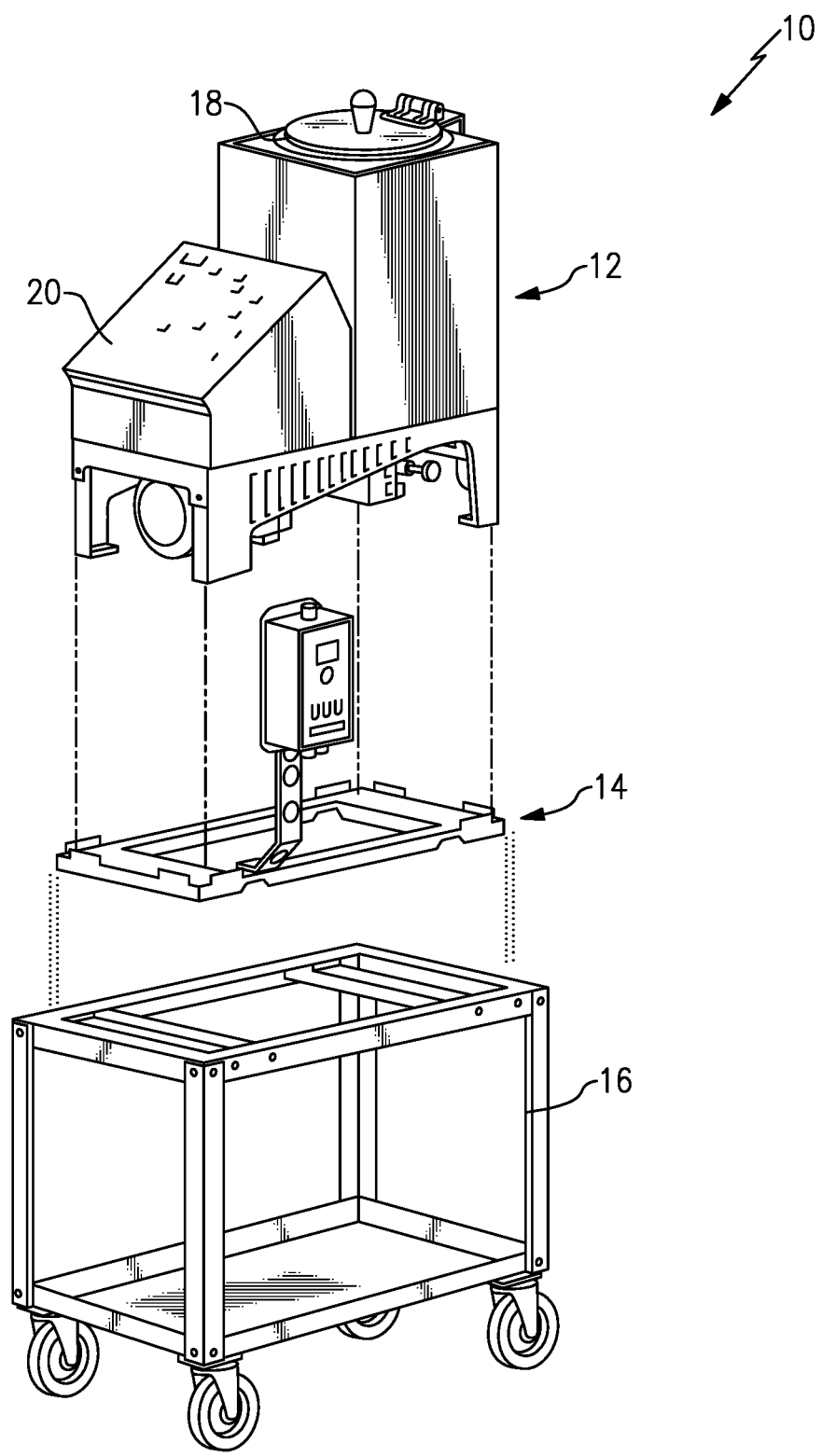
FIG. 1 illustrates an exemplary hot melt system designed according to an embodiment of this invention.

FIG. 1 illustrates an exploded view of an example hot melt system 10. The system 10 includes a melt unit 12 and a level detector 14 placed on a surface, such as a cart 16. Although a cart 16 is illustrated, the melt unit 12 and level detector 14 may be placed on other surfaces, such as the ground or a table.

The melt unit 12 has a melt tank 18 and a control panel 20. The melt tank 18 receives solid hot melt materials for melting. After the hot melt material is melted, it may be applied, such as in a bead or spray pattern. Upon cooling, the hot melt material solidifies, forming an adhesive bond. Example hot melt materials that may be used with this exemplary hot melt system 10 include thermoplastics such as Ethylene-vinyl acetate (EVA), polyolefins, polyamides, pressure sensitive adhesives, and other materials. The hot melt material may begin in a pellet form, block form, or pillow form, for example.

Figure 2:
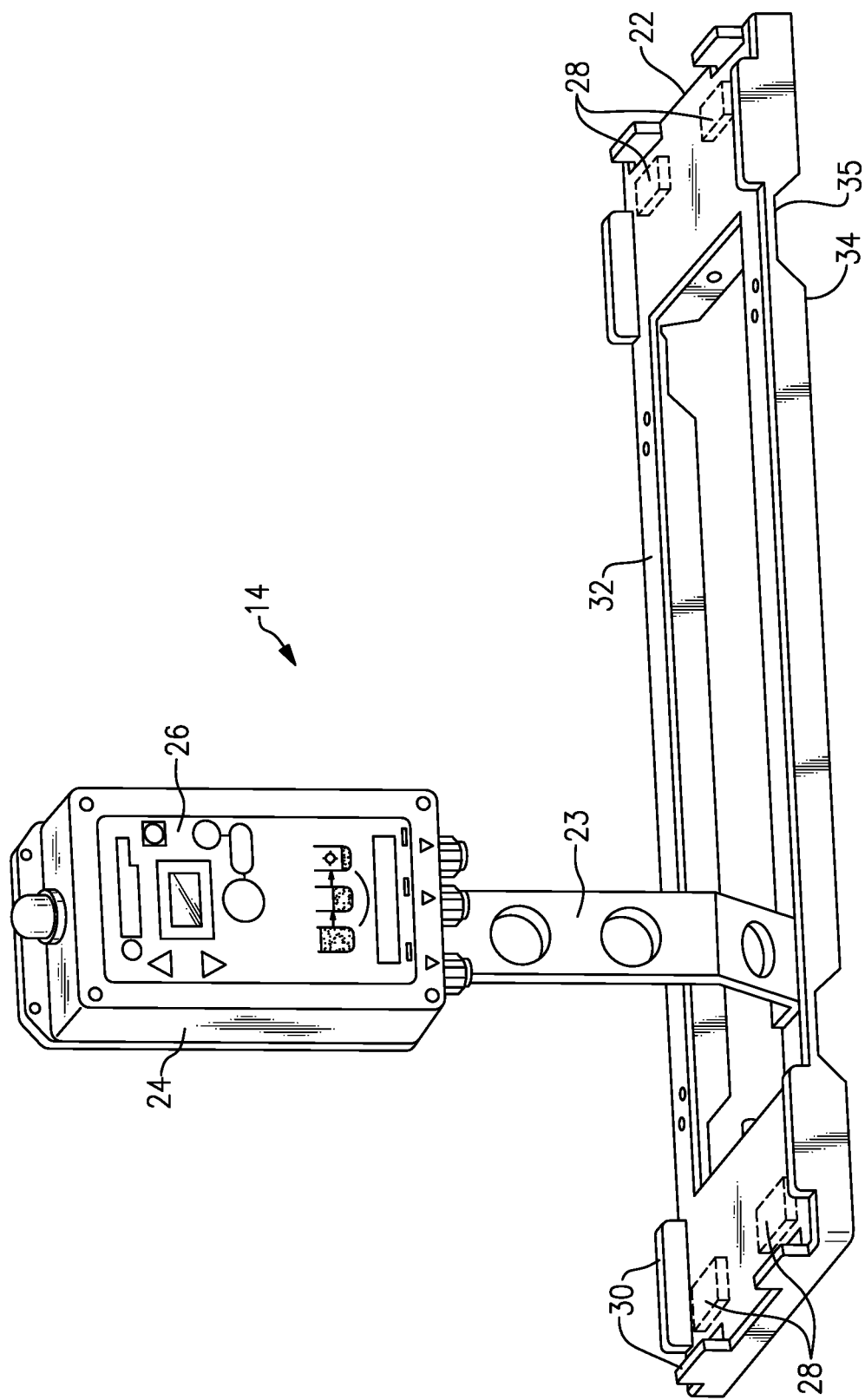
FIG. 2 illustrates an exemplary level detector for a hot melt system designed according to an embodiment of this invention.
Figure 3:
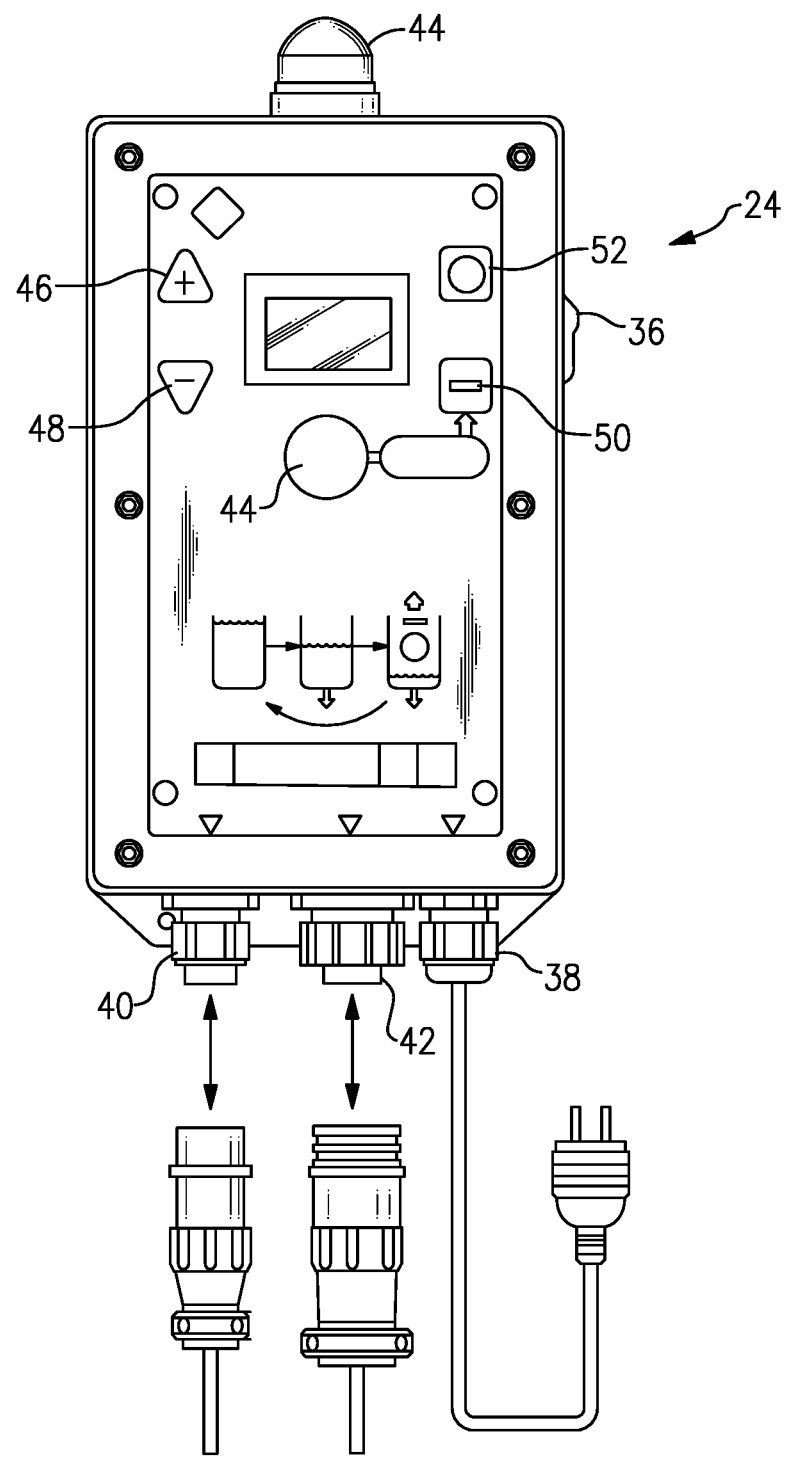
FIG. 3 illustrates a control box for an exemplary level detector.

The hot melt unit 12 works best when the melt tank 18 is kept sufficiently full. The melt unit 12 is placed atop a level detector 14 to detect the amount of hot melt material in the melt tank 18. FIG. 2 illustrates an example level detector 14. The level detector 14 includes a scale platform 22 and electrical control box 24 with a user interface 26 that allows a user or operator to change settings of the level detector 14. In the illustrated embodiment, the electrical control box 24 is mounted on the scale platform 22 via a control box stand 23. In other embodiments, the electrical control box 24 may be mounted directly on the scale platform 22, for example. The scale platform 22 includes several load sensing elements 28. The level detector 14 determines the tank fill level by detecting a weight of the melt unit 12 and its contents via the load sensing elements 28. In some embodiments the load sensing elements 28 comprise load cells.

The scale platform 22 may be a metal platform, for example. In the illustrated embodiment, the scale platform 22 is rectangular in shape. In other embodiments, the scale platform 22 may be a different shape, depending upon the melt unit 12. The scale platform 22 is sized to fit on the cart 16 or other surface and support the melt unit 12 (shown in FIG. 1). The scale platform 22 may have a plurality of tabs 30 along a perimeter of the platform 22 to locate the melt unit 12 on the scale platform 22. In the illustrated embodiment, the scale platform 22 has eight tabs 30 extending upward from an upper surface 32 for locating the melt unit 12. The platform 22 may also include tabs 30 extending downward from a lower surface 34. In some embodiments, the platform 22 may have more or fewer tabs 30. In use, the upper surface 32 of the platform 22 abuts the hot melt unit 12. The load sensing elements 28 are mounted on the lower surface 34, and abut the cart 16 or other surface. The platform 22 may have notches 35 to accommodate any protrusion from the cart 16 or other surface to prevent such surface from interfering with the load sensing elements 28. In the illustrated embodiment, the scale platform 22 includes four load sensing elements 28, each placed beneath one of the four corners of the melt unit 12. Although four load sensing elements 28 are illustrated, more or fewer load sensing elements 28 may fall within the scope of this disclosure.

The electrical control box 24 includes at least one computing device, such as a microprocessor, that determines the amount of hot melt material in the tank 18 and alerts an operator when the tank 18 needs to be refilled. The electrical control box 24 detects signals indicative of a weight of the melt unit 12 from the load sensing elements 28 through a scale cable connector 42. The electrical control box 24 may be powered via a power cable input 38 and may include a power switch 36 to turn the level detector on and off. In some embodiments, the electrical control box 24 may also include an output cable connector 40. In the illustrated embodiment, an indicator 44 is located on the control box 24, which provides an alert to the operator that the tank 18 needs refilling. The indicator 44 may be an audible indicator, such as an alarm and/or a visual indicator, such as a light.

An operator may set a maximum allowable weight decrease, or "fill amount," and the indicator 44 will alert the operator when the detected weight has decreased by an amount corresponding to the maximum allowable weight decrease. Alternatively, the operator may set a desired minimum weight using the electrical control box 24 and when the detected weight drops below this amount, the indicator 44 will alert the operator to refill the melt tank 18. The operator may be notified via an audible alarm, visual indicator, or another output from the user interface 26.

The interface 26 of the electrical control box 24 allows the operator to select the desired fill amount for a particular use. The electrical control box 24 may have a "SET FULL" or "RESET" button 50 for the user or operator to set the full tank weight, "INCREMENT" and "DECREMENT" buttons 46, 48 for the operator to change the maximum allowable weight decrease or fill amount, and a "QUIET" button 52 for the operator to temporarily disable the notification. In some embodiments, the operator may set the desired minimum weight.

In some embodiments, the tank 18 may hold between 15 and 200 pounds of hot melt material. The operator may want to keep the tank 18 at least half full. In this case, the maximum allowable weight decrease would be half of the full tank weight or approximately 100 pounds. In other embodiments, the maximum allowable weight decrease may be ⅓ or ¼ of the full tank weight. In other embodiments, the operator may set the desired minimum weight. The desired minimum weight is the full tank weight minus the maximum allowable weight decrease. For example, if a tank 18 holds 15 pounds of hot melt material, the maximum allowable decrease, or fill amount, in weight might be 5 pounds or the desired minimum weight might be 10 pounds.

The level detector 14 may be used for manual refill hot melt systems or for automatic refill systems. In an embodiment, a switch on the electrical control box 24 allows an operator to switch between a manual refill mode and an automatic refill mode. The manual refill mode is used for systems 10 that require an operator to refill the tank 18. The automatic refill mode allows the level detector 14 to be used with an automatic refill system. One such automatic refill system is the commercially available Hot Melt Technologies' ProFill system. An example automatic refill system includes an auto-feed system to transfer hot melt material from an auxiliary hopper into the tank 18. An automatic refill system may use a vacuum wand, for example, to transfer hot melt material into the tank 18. When the level detector 14 is used with such an automatic refill system, the operator sets an amount of hot melt material that can dispense from the melt unit 12 before the automatic refill system will refill the tank 18. This amount may be known as the "fill amount." In one example embodiment, the operator may select a maximum allowable weight decrease during setup. The control box 24 communicates with a controller of the automated filler whenever the allowable weight decrease occurs causing the tank 18 to be automatically refilled.

Using the disclosed level detector 14 with an automatic refill system may eliminate the need for potentially expensive and heat sensitive sensors inside the tank 18 to detect the level in the tank 18. Using the level detector 14 with a manual refill system allows an operator to move away from the hot melt unit 12 without having to constantly check the tank level. The indicator 44 will alert the operator when the tank 18 requires refilling.

Figure 4:
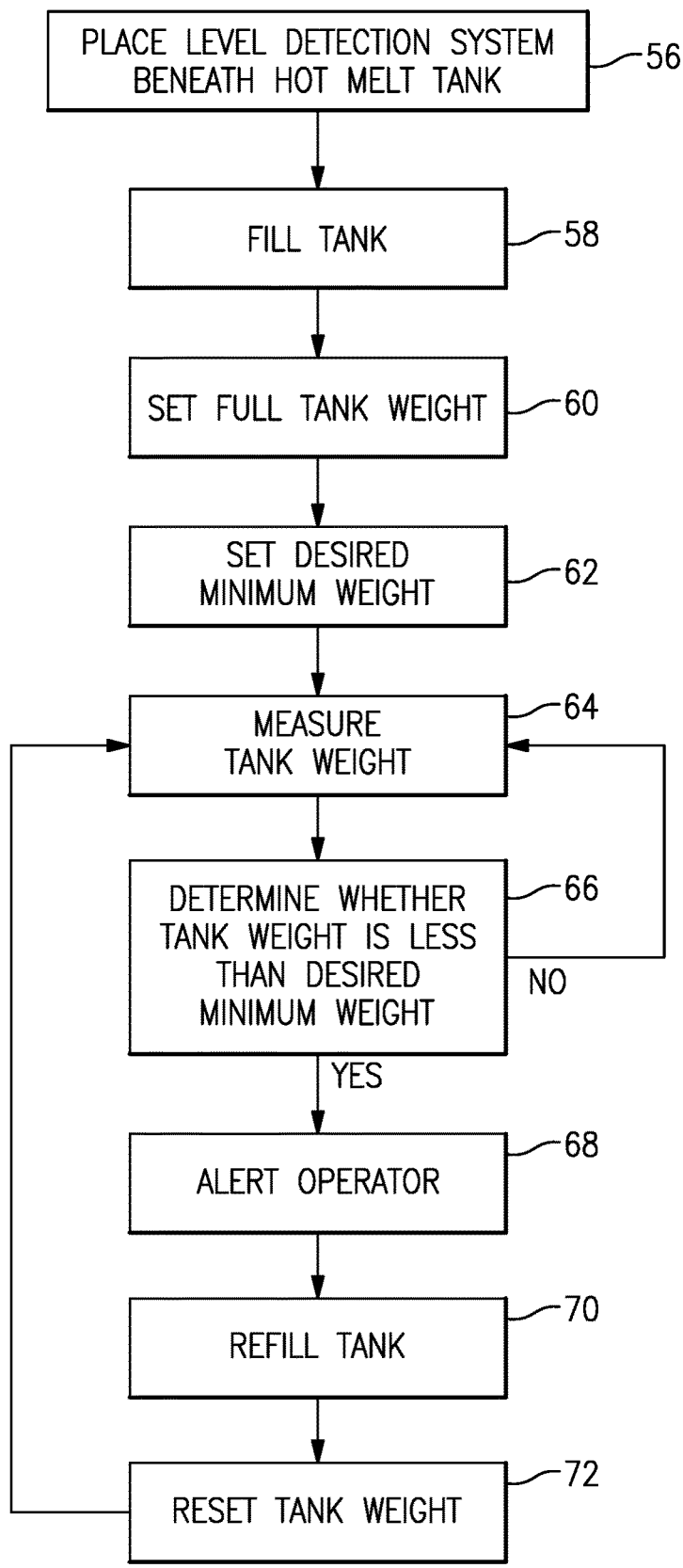
FIG. 4 summarizes an example method for maintaining a desired fill level in a hot melt system in flow chart form.

FIG. 4 summarizes an example method of maintaining a desired fill level in a hot melt system 10. After a level detector 14 is properly associated with a hot melt unit 12, such as being place beneath it, at 56, the operator fills the tank 18 of the hot melt unit 12 at 58, and sets a "full weight" value of the hot melt unit 12 through the user interface 26 by pressing the "SET FULL" or "RESET" button 50 at 60. This full weight value is the weight of the hot melt unit 12 when the tank 18 is filled by the operator prior to use and may vary from a total capacity of the tank 18. The full weight level may differ from job to job or user to user for various reasons and the control panel accommodates a range of user preferences or requirements. Since the operator could start with different amounts of hot melt material in the tank 18 each time the hot melt unit 12 is used, the full weight value may vary. The operator then sets a maximum allowable weight decrease and the control box 24 determines the desired minimum weight at 62. The desired minimum weight is determined by the control box 24, for example, by subtracting the allowable weight decrease from the full weight. In some embodiments, the operator sets the desired minimum weight, instead of a weight decrease. The desired minimum weight is the weight of the hot melt unit 12 when the tank 18 contains the least amount of hot melt material that is acceptable or desired before the operator adds more hot melt material to the tank 18.

After the operator has set the full tank weight and desired minimum weight or maximum allowable weight decrease and is dispensing melted adhesive, the electronic control box 24 checks the weight of the hot melt unit 12 periodically at 64. In one example, the electronic control box 24 checks the weight at least once per minute. In another example, the weight is checked about every 3 seconds. The weight may be checked more or less frequently, in other examples. Each time the weight is checked, the electronic control box 24 determines whether the weight is less than the desired minimum weight at 66. If the weight is not less than the desired minimum weight, the electronic control box 24 continues periodically checking the weight at 64. If the weight is less than the desired minimum weight, the control box 24 alerts the operator with the indicator 44 at 68. The alert may be an audible alarm, visual indicator, or both. The operator, prompted by the alert, refills the tank 18 with hot melt material at 70. The operator may then reset the full tank weight at 72. The full tank weight may be reset each time the tank is refilled because the operator may fill the tank 18 with different amounts of hot melt material each time or the remaining amount of material in the tank 18 at the time the operator adds more can vary. Once the tank is refilled and the operator selects the desired minimum weight through the user interface 26, the control box 24 again periodically checks the weight at 64 while the holt melt unit is in use.

The disclosed example embodiment ensures that the tank 18 will be replenished or refilled at an appropriate time without requiring an individual to continuously monitor the level of material in the tank 18. One feature of embodiments of this invention is that a single operator may keep multiple hot melt units running at a given time without a risk that any of them will be undesirably depleted or emptied of hot melt material. Another feature of embodiments of this invention is that they eliminate any need for complicated or expensive sensors within the tank 18. Additionally, each of the potentially different initial fill levels and minimum required amounts for a variety of materials or applications are readily accommodated as the user or operator easily controls the conditions in which the alert to refill will be given.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A level detection system for a hot melt unit, comprising:
   a scale having a load cell, the load cell configured to be placed beneath a tank of a hot melt unit;
   a controller having an indicator configured to alert an operator when a weight of the hot melt unit detected by the load cell has decreased by a user-selected maximum allowable amount; and
   a user interface configured to allow the operator to select the maximum allowable amount, wherein the user interface has a reset button for the operator to reset the indicator.

2. The level detection system of claim 1, wherein the scale is rectangular and configured to fit beneath the hot melt unit.

3. The level detection system of claim 2, wherein the scale has four load cells, one at each corner of the rectangular scale.

4. The level detection system of claim 1, wherein the controller is configured to periodically receive signals from the load cell.

5. The level detection system of claim 1, wherein the indicator is a visual indicator.

6. The level detection system of claim 1, wherein the indicator is an audible alarm.

7. The level detection system of claim 1, wherein the user interface is configured to allow the operator to select between a manual refill mode and an automatic refill mode.

8. The level detection system of claim 1, wherein the indicator is both an audible alarm and a visual indicator.

9. A hot melt system, comprising:
   a melt unit having a melt tank;
   a scale having a load cell arranged beneath the melt unit; and
   a controller having an indicator configured to alert an operator when the scale detects a weight of the melt unit has decreased by a user-selected maximum allowable amount; and
   a user interface configured to allow the operator to select the maximum allowable amount, wherein the user interface has a reset button for the operator to reset the indicator.

10. The hot melt system of claim 9, wherein the scale comprises four load cells, one positioned near each of four corners of the melt unit.

11. The hot melt system of claim 9, wherein the indicator is an audible alarm.

12. The hot melt system of claim 9, wherein the indicator is a visual indicator.

13. The hot melt system of claim 9, wherein the controller is configured to periodically receive signals from the scale.

14. A method of maintaining a desired fill level in a hot melt tank using a level detection system having a scale situated to detect a weight of a hot melt tank, the method comprising:
   setting a tank full weight;
   determining a user-selected desired minimum weight of the hot melt tank;
   periodically measuring the weight of the hot melt tank with the scale; and
   alerting an operator when the weight of the hot melt tank falls below the desired minimum weight, wherein alerting the operator comprises sounding an audible alarm.

15. The method of claim 14, wherein the determining the desired minimum weight is based upon selecting a maximum allowable weight decrease, and wherein the desired minimum weight corresponds to the tank full weight minus the maximum allowable weight decrease.

16. The method of claim 14, comprising:
   refilling a tank of the hot melt system; and
   resetting the tank full weight of the hot melt system.

17. The method of claim 16, comprising silencing the alarm after refilling the tank.

* * * * *